United States Patent [19]
Takahashi et al.

[11] Patent Number: 5,745,056
[45] Date of Patent: Apr. 28, 1998

[54] SINGLE-HAND INPUT KEYBOARD

[75] Inventors: Kimiyo Takahashi, Iiyama; Masakatsu Sugimoto, Kawasaki, both of Japan

[73] Assignees: Fujitsu Limited, Kawasaki; Fujitsu Takamisawa Component Limited, Tokyo, both of Japan

[21] Appl. No.: 614,855

[22] Filed: Mar. 12, 1996

[30] Foreign Application Priority Data

Oct. 20, 1995 [JP] Japan .................................. 7-273020

[51] Int. Cl.⁶ .................................................. G06F 3/02
[52] U.S. Cl. ............................ 341/22; 341/176; 400/489
[58] Field of Search ............................... 341/20, 22, 21, 341/176; 364/709.01, 709.12; 400/489

[56] References Cited

U.S. PATENT DOCUMENTS

| | | | |
|---|---|---|---|
| 4,905,001 | 2/1990 | Penner | 431/20 |
| 5,332,322 | 7/1994 | Gambaro | 400/489 |
| 5,373,458 | 12/1994 | Bishay | 364/708.1 |
| 5,432,510 | 7/1995 | Mathews | 341/20 |
| 5,486,823 | 1/1996 | Tsai | 341/22 |
| 5,497,151 | 3/1996 | Dombroski | 341/22 |
| 5,500,643 | 3/1996 | Grant | 341/22 |
| 5,508,703 | 4/1996 | Okamura | 341/176 |
| 5,552,782 | 9/1996 | Horn | 341/22 |

FOREIGN PATENT DOCUMENTS

| | | |
|---|---|---|
| 4-055629 | 5/1992 | Japan. |
| 4-180115 | 6/1992 | Japan. |
| 6-083508 | 3/1994 | Japan. |

*Primary Examiner*—Jeffery Hofsass
*Assistant Examiner*—Albert K. Wong
*Attorney, Agent, or Firm*—Staas & Halsey

[57] ABSTRACT

This invention relates to a single-hand input keyboard for inputting data into various data processing devices, which can be held and operated by a single hand. The keyboard includes a case having an upper case and a lower case, the upper case having an opening at a central portion thereof, a switch unit mounted in the case, the switch unit having a plurality of button switches facing the opening, and a holder formed in a back face of the case. A plurality of the button switches are arranged so as to be pressed by fingers when the single-hand input keyboard is held by a single hand with the thumb and the palm.

22 Claims, 5 Drawing Sheets

SINGLE-HAND INPUT KEYBOARD

BACKGROUND OF THE INVENTION

1. Field of the Invention

The present invention generally relates to a single-hand input keyboard for inputting data such as characters and symbols into various data processing devices, such as personal computers, and more particularly to a single-hand input keyboard which can be held and operated by a single hand.

2. Description of the Related Art

Generally, a keyboard for inputting data into a data processing device such as a personal computer is designed to be placed on a desk, and to be operated by both hands. However, in some circumstances, for example, when the data is input during conferences or a standing conversation, it is preferred that the data is input with a single hand blindly. In a conventional keyboard, a large number of keys are arranged on an operational board at a high density. Thus, even if the keyboard is decreased in size in order to be handled by the single hand, it is still difficult to input the data blindly. In order to solve the above problem, new methods for inputting the data by using combinations of a limited number of keys, have been proposed so far. For utilizing the above methods, a single-hand input keyboard is desired to be developed.

Currently, as a portable data processing device, an electronic notebook having a keyboard is widely used. Also, there has been a data processing device in which data can be input by drawing characters with a pen on a screen instead of pressing the keys of the keyboard. In the keyboard incorporated in the portable data processing device such as the electronic notebook, a plurality of key tops are arranged at a high density. The data is input by pressing the selected key tops with, for example, a pen tip. In the data processing device in which the data is input by drawing characters with the pen on the screen, a coordinate reading device and a device for recognizing hand-written characters is used. In this device, coordinates of a path of the pen are read and are contrasted with patterns input in advance when the data is input.

However, in the portable data processing devices described above, the data cannot be input by a single-hand operation. That is, when the data is input, the portable data processing device must be placed on a desk or held by the other hand. Further, the data cannot be input blindly. Moreover, data input speed is low, compared with the conventional keyboard.

SUMMARY OF THE INVENTION

Accordingly, it is a general object of the present invention to provide a novel and useful single-hand input keyboard in which the data can be input by a single hand blindly.

The above object of the present invention is achieved by a single-hand input keyboard comprising a case including an upper case and a lower case, the upper case having an opening at a central portion thereof, a switch unit mounted in the case, the switch unit having a plurality of button switches facing the opening, and a holder formed in a back face of the case, wherein a plurality of the button switches are arranged so as to be pressed by fingers when the single-hand input keyboard is held by a single hand with a thumb and a palm.

The above invention may further include a palm rest provided in a side face of the case facing the palm when the single-hand input keyboard is held by a single hand.

The above invention may further include a cover, the cover covering the opening of the upper case to protect the button switches when the single-hand input keyboard is not operated, the cover being attached to the lower case when the single-hand input keyboard is operated, and the holder is provided in an exposed face of the cover when the cover is attached to the lower case.

In the above invention, the switch unit may include a panel attached to the case, a printed circuit board mounted in the panel and an acoustic sheet provided between the panel and the printed circuit board and, each of the button switches comprises a switching element mounted on the printed circuit board and a key top positioned above the switching element, the key top being provided slidably in the panel.

In the above invention, the case may include an engaging portion rotatably supporting a first end of the switch unit and a supporting portion extending from a bottom plate of the case, the supporting portion supporting a second end of the switch unit, the switch unit being positioned between the lower case and the supporting portion when the switch unit is pressed downwardly, the switch unit being positioned between the upper case and the supporting portion when the switch unit is pressed upwardly, the switch unit having a lever in a lower face thereof, the switch unit positioned between the lower case and the supporting portion and being pushed upwardly by the lever when the cover is attached to the lower case.

In the above invention, the button switches provide home positions for the fingers which are different from the button switches adjacent to the home positions in at least one of height and shape.

In the above invention, the key top may include a key top body and an elastic resin portion provided on an exposed surface of the key top body.

In the above invention, the switch unit may further include a pointing device.

According to the present invention, the single-hand input keyboard can be held by a single hand through the palm rest provided slidably in the side face of the case facing the palm and the holder in which the thumb is placed when operated. Also, since a plurality of the button switches are arranged so as to be pressed by the fingers, the data can be input with a single hand. Further, since the button switches of the home positions have different height and shape from the button switches adjacent to the home positions, the data can be input blindly. Therefore, according to the present invention, the single-hand input keyboard is provided in which the data is input at a high speed blindly.

Other objects and further features of the present invention will be apparent from the following detailed description when read in conjunction with the accompanying drawings.

DESCRIPTION OF THE PREFERRED EMBODIMENTS

The preferred embodiments of the present invention will now be described in further detail with reference to the accompanying drawings.

Figure 1:
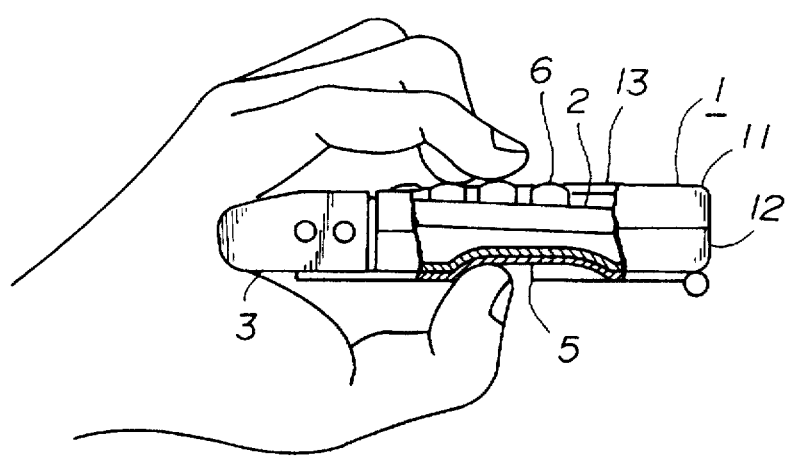
FIG. 1 is a cross sectional view showing a single-hand input keyboard of the present invention.
Figure 2:
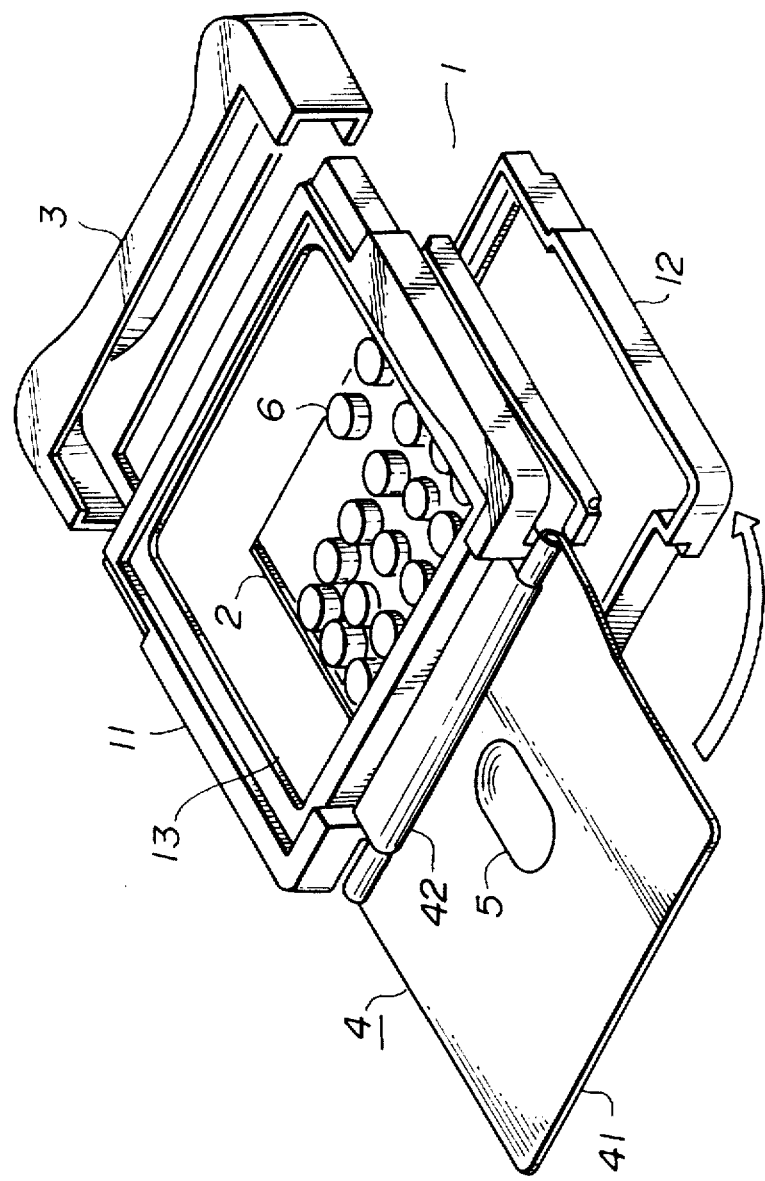
FIG. 2 is an exploded perspective view showing the single-hand input keyboard of the present invention.

Referring to FIGS. 1 and 2, a single-hand input keyboard has a case 1, which includes an upper case 11 and a lower case 12. At a central portion of the upper case 11, an opening 13 is formed. After a switch unit 2 is provided in the opening 13, the lower case 12 is connected to the upper case 11.

In a side face of the case 1 facing a palm when the case 1 is held by a single-hand, a palm rest 3 is provided slidably. In an opposite side face, a cover 4 is provided to cover at lease the opening 13 of the upper case 11 when the keyboard is carried.

The cover 4 includes a cover body 41 and a link mechanism 42. The cover body 41 has a holder 5 in an exposed face when the cover 4 is attached to the lower case 12. When the keyboard is carried, the cover is attached to the upper case 11. When the keyboard is operated, the cover is turned over and is attached to the lower case 12.

The holder 5 is a recess in which the user's thumb is placed when the case 1 is held for an operation. That is, the thumb is placed in the recess to hold the case 1. In the recess, a rubber layer may be provided in order to prevent a slipping of the thumb.

Figure 3:
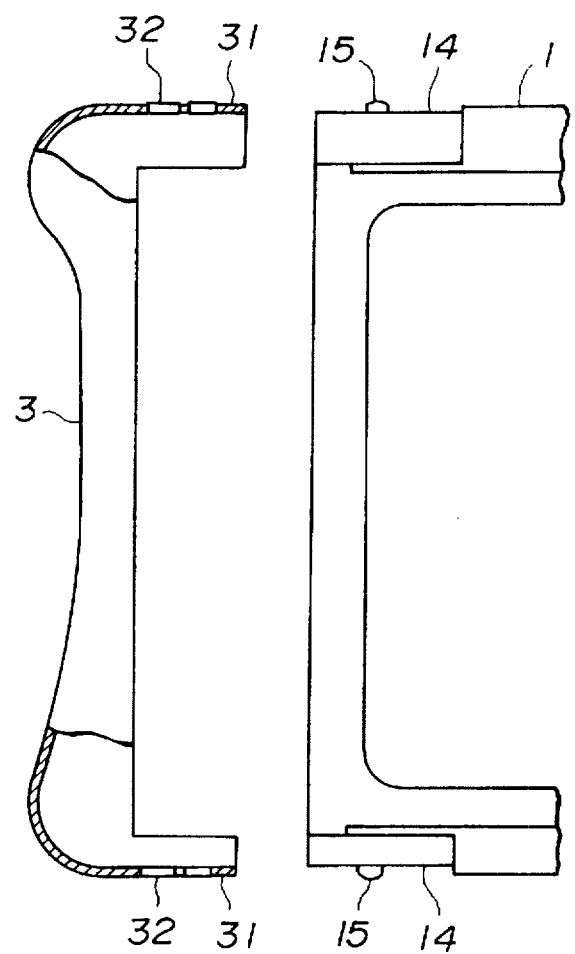
FIG. 3 is a cross sectional view showing a palm rest.

A face of the palm rest 3 facing the palm is designed to fit the palm, as shown in FIG. 3. In both ends of the palm rest, U-shaped guide portions 31 are provided. When stage portions 14 formed into the case 1 are inserted in to the guide portions 31, the palm rest 3 is provided slidably.

At least one of the stage portions 14 has a pin 15 supported and urged by a spring mechanism (not shown) in an axial direction. When the palm rest 3 is adjusted in response to the size of the palm, the pin 15 is inserted into a hole formed in the guide portion 31 to secure the palm rest 3.

Figure 4A:
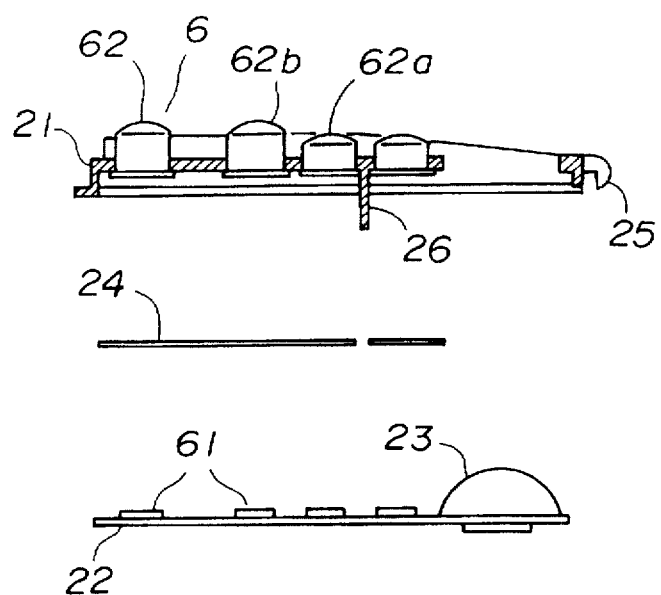
FIG. 4A is an exploded cross sectional view showing a switch unit.

The switch unit 2 has a panel 21 connected to the case 1 and a printed circuit board 22 connected to the panel 21, as shown in FIG. 4A. On an upper face of the printed circuit board 22, a plurality of switching elements 61 and a pointing device 23 for moving a cursor are provided.

Above the switching elements 61, a plurality of key tops 62, 62a, 62b are provided slidably in the panel 21. The switch element 61, the key top and an acoustic sheet 24 provided therebetween constitute button switch 6.

Figure 4B:
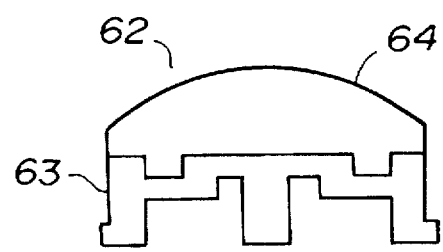
FIG. 4B is a cross sectional view showing a key top.

The key top 62, 62a, 62b may be molded with a single resin. However, in order to prevent a slipping of the finger, the key top 62 may have a key top body 63 and a covering layer 64 made of a rubber resin having an elasticity provided on the key top body 63, as shown in FIG. 4B.

In the pointing device 23 mounted on the printed circuit board 22, piezoelectric elements are provided. The pointing device 23 is exposed through a through hole formed in the panel 21 to reduce the size and weight of the device.

In the keyboard for inputting data into the data processing device, it is required that an electronic circuit for converting a signal from the button switches into a code for the data processing device be provided. In this embodiment, such an electronic circuit is mounted on an opposite face of the printed circuit to the face on which the switching elements are mounted.

In order to blindly input the data at a high speed in the single-hand input keyboard, it is required that home positions of the fingers are easily recognized blindly and all button switches can be readily recognized with reference to the home positions blindly.

Thus, for each finger, a height of a key top 62a of the home position is made different from that of a key top 62b adjacent to the key top 62a, as shown in the drawings. For example, the key top 62b provided more closely to the palm is higher than the key top 62a of the home position.

In the single-hand input keyboard, the key top 62b is higher than the key top 62a of the home portion and is provided more closely to the palm. The key top 62b can be pressed by laying the finger against the key top 62b without shifting the finger from the key top 62a.

Also, the key tops of both lateral sides of the home position are made higher than the key top 62a of the home position for an easy recognition of the home position.

In order to reduce the keyboard in thickness, it is desired that the switch unit 2 is housed in the case 1 and covered with the cover 4 when carried and that the cover 4 is attached to a bottom face of the case 1 and the switch unit 2 is exposed from the case 1 when operated.

In order to realize the above-mentioned structure, the switch unit 2 may be provided as follows. The panel 21 of the switch unit 2 has a hook 25, and the case 1 has an engaging portion 16 to which the hook 25 is rotatably connected and a plurality of supporting portions extend from a bottom plate of the lower case 12.

Figure 5A:
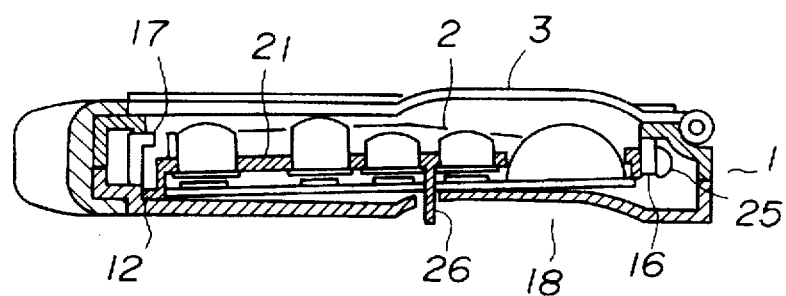
FIG. 5A is a cross sectional view showing the switch unit when the single-hand input keyboard is carried.

When the switch unit 2 is pressed downwardly, one end of the switch unit 2 is arranged between the bottom plate of the lower case 12 and the supporting portions 17, as shown in FIG. 5A. In this case, the cover can be secured to the upper case 11 to cover the opening 13 and to be portable.

Also, when the switch unit 2 is pressed downwardly, a lever 26 extending downwardly from the panel 21 protrudes from the bottom plate of the lower case 12, more particularly, from a recess portion 18 formed in the lower case 12.

Figure 5B:
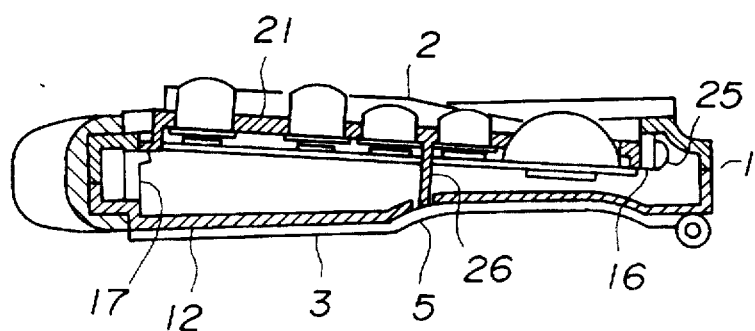
FIG. 5B is a cross sectional view showing the switch unit when the single-hand input keyboard is operated.

When the keyboard is operated, the cover 4 is attached to the lower case 12 and the opposite face of the holder 5 is put in the recess portion 18. In this case, the switch unit 2 is shifted upwardly through the lever 26 and the one end of the switch unit 2 is arranged between the upper case 11 and the supporting portions, as shown in FIG. 5B.

Since the supporting portion 17 for supporting the switch unit 2 has an elasticity, the switch unit 2 is prevented from falling down from the supporting portions 17 even when the switch unit 2 is pressed downwardly.

According to the present invention, the single-hand input keyboard can be held by a single hand through the palm rest 3 slidably provided in the side face of the case 1 facing the palm and the holder 5 in which the thumb is placed when operated, as described above. Also, since a plurality of the button switches 6 are arranged so that they can be pressed by the fingers except the thumb, the data can be input with a single hand. Further, since the button switches of the home positions have different height and shape from the button switches adjacent to the home positions, the data can be input blindly. That is, according to the present invention, the single-hand input keyboard can be provided in which the data is blindly input at a high speed.

Further, the present invention is not limited to these embodiments, but various variations and modifications may be made without departing from the scope of the present invention.

What is claimed is:

1. A single-hand input keyboard comprising:
   a case including an upper case and a lower case, said upper case having an opening at a central portion thereof;
   a switch unit mounted in said case, said switch unit having a plurality of button switches facing said opening; and
   a holder formed in a back face of said case,
     wherein a plurality of said button switches are arranged so as to be pressed by fingers when said single-hand input keyboard is held by a single hand with a thumb and a palm, wherein the holder holds the thumb.

2. The single-hand input keyboard according to claim 1, further comprising a palm rest provided in a side face of said case facing said palm when said single-hand input keyboard is held by a single hand.

3. The single-hand input keyboard according to claim 1, further comprising a cover, said cover covering said opening of said upper case to protect said button switches when said single-hand input keyboard is not operated, said cover being attached to said lower case when said single-hand input keyboard is operated, and said holder is provided in an exposed face of said cover when said cover is attached to said lower case.

4. The single-hand input keyboard according to claim 2, further comprising a cover, said cover covering said opening of said upper case to protect said button switches when said single-hand input keyboard is not operated, said cover being attached to said lower case when said single-hand input keyboard is operated, and said holder is provided in an exposed face of said cover when said cover is attached to said lower case.

5. The single-hand input keyboard according to claim 1, wherein said switch unit comprises a panel attached to said case, a printed circuit board mounted in said panel and an acoustic sheet provided between said panel and said printed circuit board and, each of said button switches comprises a switching element mounted on said printed circuit board and a key top positioned above said switching element, said key top being provided slidably in said panel.

6. The single-hand input keyboard according to claim 1, wherein said case has an engaging portion rotatably supporting a first end of said switch unit and a supporting portion extending from a bottom plate of said case, said supporting portion supporting a second end of said switch unit, said switch unit being positioned between said lower case and said supporting portion when said switch unit is pressed downwardly, said switch unit being positioned between said upper case and said supporting portion when said switch unit is pressed upwardly,
   said switch unit having a lever in a lower face thereof, said switch unit positioned between said lower case and said supporting portion and being pushed upwardly by said lever when said cover is attached to said lower case.

7. The single-hand input keyboard according to claim 1, wherein said button switches provide home positions for said fingers which are different from said button switches adjacent to said home positions in at least one of height and shape.

8. The single-hand input keyboard according to claim 5, wherein said button switches provide home positions for said fingers which are different from said button switches adjacent to said home positions in at least one of height and shape.

9. The single-hand input keyboard according to claim 5, wherein said key top comprises a key top body and an elastic resin portion provided on an exposed surface of said key top body.

10. The single-hand input keyboard according to claim 1, wherein said switch unit further comprises a pointing device.

11. The single-hand input keyboard according to claim 5, wherein said switch unit further comprises a pointing device.

12. A single-hand input keyboard comprising:
    a case including an upper case and a lower case, said upper case having an opening at a central portion thereof;
    a switch unit mounted in said case, said switch unit having a plurality of button switches facing said opening;
    a holder formed in a back face of said case,
      wherein a plurality of said button switches are arranged so as to be pressed by fingers when said single-hand input keyboard is held by a single hand with a thumb and a palm; and
    a palm rest provided in a side face of said case facing said palm when said single-hand input keyboard is held by a single hand,
      wherein said case has an engaging portion rotatably supporting a first end of said switch unit and a supporting portion extending from a bottom plate of said case, said supporting portion supporting a second end of said switch unit, said switch unit being positioned between said lower case and said supporting portion when said switch unit is pressed downwardly, said switch unit being positioned between said upper case and said supporting portion when said switch unit is pressed upwardly, and
      wherein said switch unit having a lever in a lower face thereof, said switch unit positioned between said lower case and said supporting portion and being pushed upwardly by said lever when said cover is attached to said lower case.

13. A single-hand input keyboard comprising:
    a case including an upper case and a lower case, said upper case having an opening at a central portion thereof;
    a switch unit mounted in said case, said switch unit having a plurality of button switches facing said opening;
    a holder formed in a back face of said case; and
    a cover, said cover covering said opening of said upper case to protect said button switches when said single-hand input keyboard is not operated, said cover being attached to said lower case when said single-hand input keyboard is operated, and said holder is provided in an exposed face of said cover when said cover is attached to said lower case,
      wherein a plurality of said button switches are arranged so as to be pressed by fingers when said single-hand input keyboard is held by a single hand with a thumb and a palm,
      wherein said case has an engaging portion rotatably supporting a first end of said switch unit and a supporting portion extending from a bottom plate of said case, said supporting portion supporting a second end of said switch unit, said switch unit being positioned between said lower case and said supporting portion when said switch unit is pressed downwardly, said switch unit being positioned between said upper case and said supporting portion when said switch unit is pressed upwardly, and
      wherein said switch unit having a lever in a lower face thereof, said switch unit positioned between said lower case and said supporting portion and being pushed upwardly by said lever when said cover is attached to said lower case.

14. A single-hand input keyboard comprising:

a case including an upper case and a lower case, said upper case having an opening at a central portion thereof;

a switch unit mounted in said case, said switch unit having a plurality of button switches facing said opening;

a holder formed in a back face of said case,
wherein a plurality of said button switches are arranged so as to be pressed by fingers when said single-hand input keyboard is held by a single hand with a thumb and a palm;

a palm rest provided in a side face of said case facing said palm when said single-hand input keyboard is held by a single hand; and a cover, said cover covering said opening of said opening of said upper case to protect said button switches when said single-hand input keyboard is not operated, said cover being attached to said lower case when said single-hand input keyboard is operated, and said holder is provided in an exposed face of said cover when said cover is attached to said lower case,
wherein said case has an engaging portion rotatably supporting first end of said switch unit and a supporting portion extending from a bottom plate of said case, said supporting portion supporting a second end of said switch unit, said switch unit being positioned between said lower case and said supporting portion when said switch unit is pressed downwardly, said switch unit being positioned between said upper case and said supporting portion when said switch unit is pressed upwardly, and
wherein said switch unit having a lever in a lower face thereof, said switch unit positioned between said lower case and said supporting portion and being pushed upwardly by said lever when said cover is attached to said lower case.

15. A single-hand input keyboard comprising:

a case including an upper case and a lower case, said upper case having an opening at a central portion thereof;

a switch unit mounted in said case, said switch unit having a plurality of button switches facing said opening; and a holder formed in a back face of said case;
wherein a plurality of said button switches are arranged so as to be pressed by fingers when said single-hand input keyboard is held by a single hand with a thumb and a palm,
wherein said switch unit comprises a panel attached to said case, a printed circuit board mounted in said panel and an acoustic sheet provided between said panel and said printed circuit board and, each of said button switches comprises a switching element mounted on said printed circuit board and a key top positioned above said switching element, said key top being provided slidably in said panel,
wherein said case has an engaging portion rotatably supporting a first end of said switch unit and a supporting portion extending from a bottom plate of said case, said supporting portion supporting a second end of said switch unit, said switch unit being positioned between said lower case and said supporting portion when said switch unit is pressed downwardly, said switch unit being positioned between said upper case and said supporting portion when said switch unit is pressed upwardly, and
wherein said switch unit having a lever in a lower face thereof, said switch unit positioned between said lower case and said supporting portion and being pushed upwardly by said lever when said cover is attached to said lower case.

16. A single-hand input keyboard comprising:

an upper housing;

a lower housing;

a plurality of keys recessed in said upper housing, said keys being provided on a surface capable of vertical movement between a recessed, closed position, and an upper, operative position, said surface including a projection that extends through a hole in said lower housing; and a cover unit that is rotatable between two positions, a closed position where the plurality of keys are covered and said cover unit is in contact with the upper housing and an open position where the cover unit is disposed in contact with said lower housing and said projection;

wherein said cover unit forces the surface to its upper, operative position by pressing said projection when said cover unit is in said open position.

17. A single-hand input keyboard according to claim 16, wherein said cover unit includes a holder in which a thumb is disposed to hold said single-hand input keyboard with said cover unit being in said open position.

18. A single-hand input keyboard according to claim 16, wherein heights of said plurality of keys vary with said surface in said operative position, thus allowing a user to distinguish different keys.

19. A single-hand input keyboard according to claim 16, further comprising a palm rest attached to said upper housing to rest a palm of the single-hand thereon.

20. A single-hand input keyboard according to claim 16, wherein said plurality of keys are mounted to a switch unit that includes said surface, a printed circuit board mounted in said surface and an acoustic sheet provided between said surface and said printed circuit board; and each of said plurality of keys includes a switching element mounted on said printed circuit board, and a key top disposed above said switching element, said key top being provided slidably in said surface.

21. A single-hand input keyboard according to claim 20, wherein said key top includes a key top body and an elastic resin portion disposed on an exposed surface of said key top body.

22. A single-hand input keyboard according to claim 16, further comprising a pointing device attached to said surface.

* * * * *